(12) United States Patent
Pain et al.

(10) Patent No.: US 6,801,258 B1
(45) Date of Patent: Oct. 5, 2004

(54) CMOS INTEGRATION SENSOR WITH FULLY DIFFERENTIAL COLUMN READOUT CIRCUIT FOR LIGHT ADAPTIVE IMAGING

(75) Inventors: Bedabrata Pain, LA, CA (US); Zhimin Zhou, Santa Clara, CA (US); Eric R. Fossum, La Crescenta, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/268,879

(22) Filed: Mar. 16, 1999

(Under 37 CFR 1.47)

Related U.S. Application Data

(60) Provisional application No. 60/078,172, filed on Mar. 16, 1998.

(51) Int. Cl.[7] .......................... H04N 5/335; H01L 27/00
(52) U.S. Cl. ..................... 348/302; 348/308; 250/208.1
(58) Field of Search ................................ 348/294, 295, 348/297, 300, 302, 307, 308; 250/208.1

(56) References Cited

U.S. PATENT DOCUMENTS

| | | | |
|---|---|---|---|
| 4,996,413 A | * | 2/1991 | McDaniel et al. ........ 250/208.1 |
| 5,402,171 A | | 3/1995 | Tagami et al. |
| 5,434,620 A | | 7/1995 | Higuchi et al. |

(List continued on next page.)

OTHER PUBLICATIONS

Mendis et al, "CMOS Active Pixel Image Sensor" IEEE Transactions on Electron Devices vol. 41, No. 3, Mar. 1994, pp 452–453.*

Panicacci et al., "Programmable Multiresolution CMOS Active Pixel Sensor", in Solid–state Sensor Arrays & CCD Camera, Proc. SPIE vol. 2654, pp. 72–81, 1996.

Zhou et al., Frame–transfer CMOS Active Pixel Sensor with Pixel Binning, special issue on Solid–State Image Sensors, IEEE Trans. On Electron Devices, vol. 44 (10), pp. 1759–1763, 1997.

Zhou et al. "A CMOS Imager with On–Chip Variable Resolution for Light–Adaptive Imaging." *1998 IEEE International Solid–State Circuits Conference* Digest of Technical papers, Feb. 5–7, 1998, pp. 174–175.

*Primary Examiner*—Ngoc-Yen Vu
*Assistant Examiner*—Timothy J. Henn
(74) *Attorney, Agent, or Firm*—Fish & Richardson P.C.

(57) ABSTRACT

An imager that is better suited for low-light detection capability. In accordance with a preferred embodiment, the imager may be easily configured to provide an imager having multi-resolution capability where SNR can be adjusted for optimum low-level detectibility. Multi-resolution signal processing functionality is provided on-chip to achieve high speed imaging, as well as low power consumption. The imager architecture employs an improved pixel binning approach with fully differential circuits situated so that all extraneous and pick-up noise is eliminated. The current implementation requires no frame transfer memory, thereby reducing chip size. The reduction in area enables larger area format light adaptive imager implementations.

12 Claims, 5 Drawing Sheets

U.S. PATENT DOCUMENTS

| | | | |
|---|---|---|---|
| 5,471,515 A | 11/1995 | Fossum et al. | |
| 5,665,959 A | 9/1997 | Fossum et al. | |
| 5,793,322 A | 8/1998 | Fossum et al. | |
| 5,841,126 A | 11/1998 | Fossum et al. | |
| 5,877,715 A | 3/1999 | Gowda et al. | |
| 5,880,691 A | 3/1999 | Fossum et al. | |
| 5,883,668 A | 3/1999 | Kazama et al. | |
| 5,886,659 A | 3/1999 | Pain et al. | |
| 5,892,540 A | 4/1999 | Kozlowski et al. | |
| 5,896,173 A | 4/1999 | Hassler | |
| 5,900,623 A | 5/1999 | Tsang et al. | |
| 5,909,026 A * | 6/1999 | Zhou et al. | 250/208.1 |
| 5,917,547 A | 6/1999 | Merrill et al. | |
| 5,920,345 A | 7/1999 | Sauer | |
| 5,929,800 A | 7/1999 | Zhou et al. | |
| 5,949,483 A | 9/1999 | Fossum et al. | |
| 6,021,172 A | 2/2000 | Fossum et al. | |
| 6,057,539 A | 5/2000 | Zhou et al. | |
| 6,166,367 A * | 12/2000 | Cho | 250/208.1 |
| 6,201,572 B1 * | 3/2001 | Chou | 348/241 |
| 6,222,175 B1 * | 4/2001 | Krymski | 250/208.1 |
| 6,388,241 B1 * | 5/2002 | Ang | 250/208.1 |
| 6,429,413 B1 * | 8/2002 | Kawahara et al. | 250/208.1 |
| 6,606,122 B1 * | 8/2003 | Shaw et al. | 348/302 |

* cited by examiner

CMOS INTEGRATION SENSOR WITH FULLY DIFFERENTIAL COLUMN READOUT CIRCUIT FOR LIGHT ADAPTIVE IMAGING

This application claims the benefit of Provisional application Ser. No. 60/078,172 filed Mar. 16, 1998.

STATEMENT AS TO FEDERALLY SPONSORED RESEARCH

The invention described herein was made in the performance of work under a NASA contract, and is subject to the provisions of Public Law 96-517 (35 USC 202) in which the Contractor has elected to retain title.

FIELD OF THE INVENTION

The present disclosure is directed to active pixel sensors, and more particularly to multi-resolution active pixel sensor array imagers for light adaptive imaging applications.

BACKGROUND

The CMOS active pixel sensor ("APS") has permitted the realization of high performance products. Each pixel has an active amplifier that buffers the photosignal. A column-parallel bus readout architecture is often used. In this architecture, the columns are connected to individual signal processing modules, which include, for example, A to D converters, and double sampling elements.

A constant challenge in smart imager technology continues to be how to enhance signal to noise ratio ("SNR") under low illumination conditions.

One way to do this is to trade spatial resolution for SNR by summing neighborhood pixels (pixel binning). A CMOS imager that averages signals from a neighborhood of pixels has been demonstrated in "Programmable Multiresolution CMOS Active Pixel Sensor", in Solid-state Sensor Arrays & CCD Camera, Proc. SPIE vol. 2654, pp. 72–81, 1996, by Panicacci, et al.

A CMOS imager with frame memory and pixel binning has been demonstrated in a reference titled, "Frame-transfer CMOS Active Pixel Sensor with Pixel Binning", special issue on Solid-State Image Sensors, IEEE Trans. On Electron Devices, vol. 44 (10), pp. 1759–1763, 1997, authored by Pain, Zhou and Fossum.

SUMMARY

The present disclosure is directed to an improved pixel-binning imager. In accordance with a preferred embodiment, the imager may be easily configured to provide an imager having multi-resolution capability where SNR can be adjusted for optimum low-level detectability.

Further in accordance with the preferred implementation, multi-resolution signal processing functionality is provided on-chip to achieve high speed imaging, as well as low power consumption.

An imager architecture described preferably has an improved pixel binning approach with fully differential circuits situated so that all extraneous and pick-up noise is eliminated. Unlike the frame-transfer APS with pixel binning, the current implementation minimizes the necessary memory, thereby reducing chip size. The reduction in area enables larger area format light adaptive imager implementations.

BRIEF DESCRIPTION OF THE DRAWINGS

FIGS. 2–1 and 2—2 are more detailed schematic diagram of the APS imager shown in FIG. 1

DESCRIPTION OF THE PREFERRED EMBODIMENTS

Figure 1:
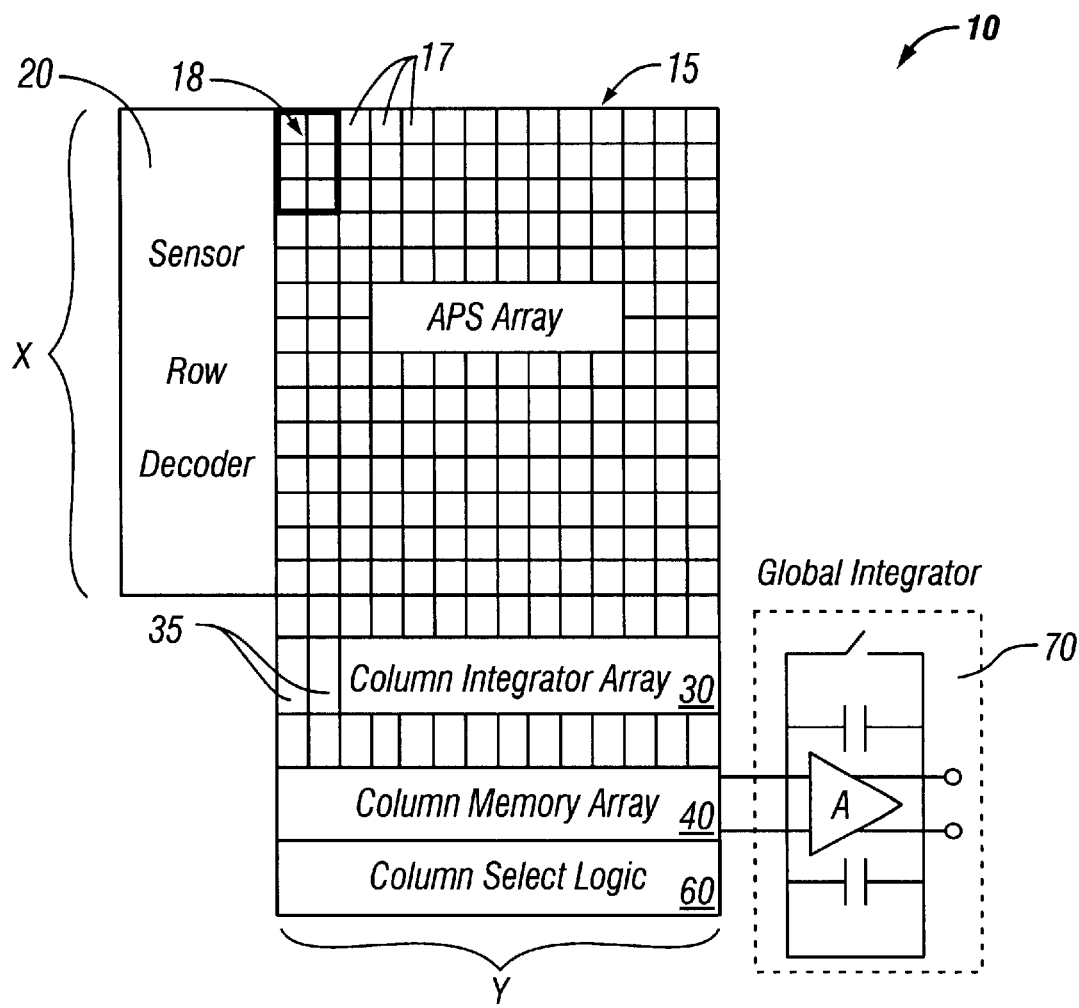
FIG. 1 is a block diagram of an APS imager with on-chip variable resolution in accordance with the present invention.

Fig. 1 is a block diagram of an APS imager 10 provided with on-chip variable resolution. Imager 10 is a variable resolution CMOS active pixel imager that enhances SNR at low illumination level. In the preferred embodiment, imager 10 is an x-row by y-column photosensitive array 15 of pixels 17. The imager includes a controller that is programmable to read out any sized kernel 18, where a kernel is an n-row by m-column block of pixels. Each kernel 18 represents the summed value of all the pixel values in its region. In the illustrative example, the kernel 18 is a 3-row by 2-column sized region in array 15.

Figures 1, 2:
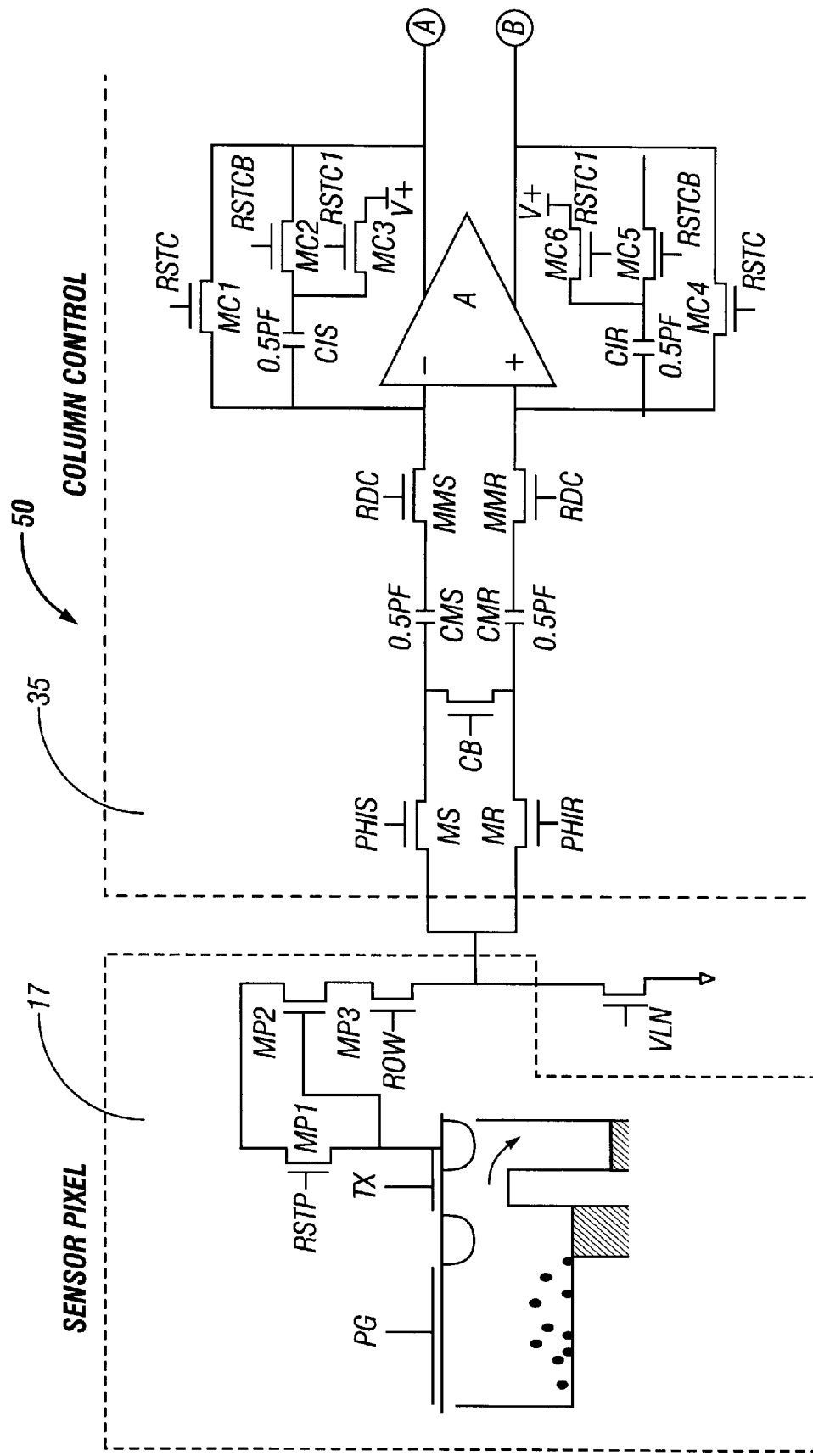
Figure 2:
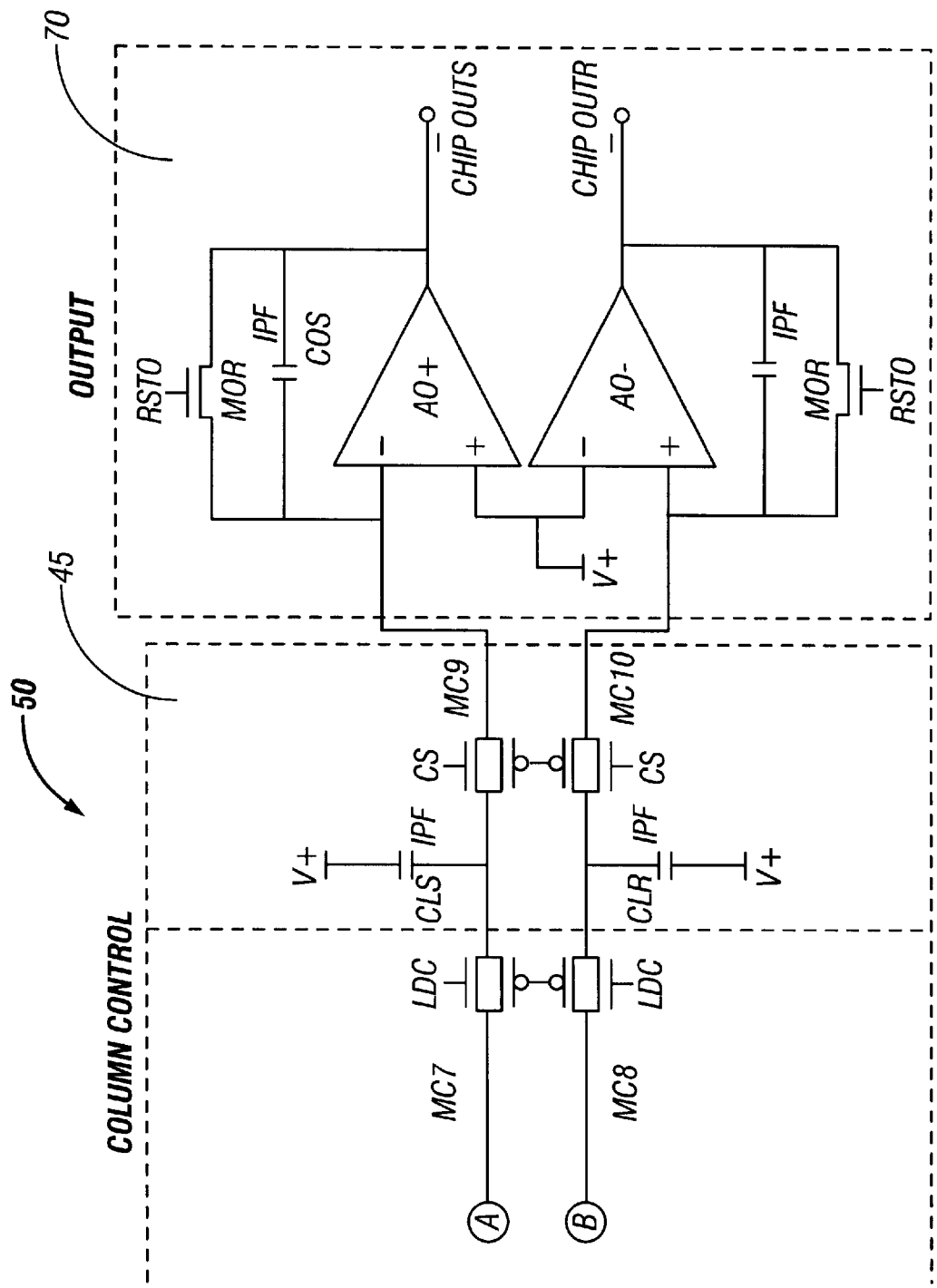

Imager 10 has a sensor row decoder 20 at the side of array 15. An entire row of pixels is selected for readout at each time. Each pixel 17 is preferably a photogate-type active pixel as shown in FIG. 2, with an in-chip buffer circuit MP2 that is controlled by a photogate transfer signal (TX) enabling readout of integrated charge by lowering the charge barrier. A reset signal (RSTP) and select signal (ROW) enable the buffered pixel signal to drive the associated column output line, all in a conventional manner.

A column integration array 30 is connected in parallel to the row outputs. An individual column integrator 35 is located at the bottom of the array, associated with each column. Each integrator 35 is associated with a row of pixels. These collectively feed associated column memory 40, which is constituted by y-columns of associated column memory circuits 45, e.g. capacitors. FIG. 2 shows details of the single column integrator 35 being coupled to its associated column memory capacitor circuit 45. The signal output from the pixel 17, is connected to the column integrator portion 35 in a differential manner. Two totally different paths to the differential opamp A are shown. One path is through the signal transistor MS, controlled by the control signal PHIS. This leads the signal through capacitor CMS, where it is again controlled through second transistor MMS. A totally parallel path for the reset signal goes through transistor MR, CMR, and MMR. To enable correlated double sampling, a crowbar circuit CB is also provided. The opamp A is connected as a fully differential switched capacitors integrators. Column memory capacitor circuit 45 uses capacitors CLS and CLR and switches MC9 and MC10 for signal and reset levels, respectively. It should be appreciated that an imager 10 with for example 512 more columns of pixels than another imager will possess 512 more column integrators and column memory capacitor circuit pairs 50. Each pair 50 serves a particular column.

In the exemplary embodiment to be described in greater detail below, imager 10 is read out one row at a time. Therefore, at a given time, one row of pixels is sampled simultaneously at the bottom of the column, using appropriate column decoder select logic 60 shown in block diagrammatic form in FIG. 1. Each pixel 16 across a sampled row is first sampled on the capacitors CMR and CMS inside associated column integrator 35 connected to a particular column. The signal PHIS is pulsed to bring the signal level onto the capacitor CMS, and the signal PHIR is momentarily pulsed to bring the reset level onto the capacitor CMR. These levels are then coupled to the opamp A by pulsing the RDC signals. The opamp differentially integrates using the integrating capacitors CIS and CIR. Double-sampling is carried out using the crowbar switch CB as described later herein. This process continues until all of the rows in a given kernel are summed.

The size of the column integrator scales linearly with the number of columns. For instance, assuming a 1024×1024 imager with a 10 μm pixel, there are 1024 column-integrators 35 and the width of each column-integrator is 10 μm. The total width of column integrator assembly 30 is then 10×1024 μm=10 cm. The length (height) of CIA 30 is of course fixed at around 2 mm.

As explained above, each column memory capacitor circuit 45 is constituted by capacitor pair CLS and CLR. There are only as many capacitors as there are columns (y-columns) in the array 15. Unlike the architecture in a frame-transfer type APS imager, this system requires only as many integrators as there are lines, and hence provides significant advantages over previous systems that required a memory for the entire frame of lines and rows.

In the case of a 1024×1024 imager, only 1024 CLSs (and CLRs) are necessary. Pixel binning is still employed but accomplished without use of an entire stored frame of pixel values. This is possible, because in full resolution mode, once a row of information makes its way through the CIA block 30 and is sampled in CLS and CLR, the information is immediately read out through the output block by successively turning on CS for successive columns.

CS is essentially a column select signal generated by column select logic 60 that causes the charges stored in CLS and CLR in a selected column to be available to a common global output integrator 70. Global output integrator 70, explained in greater detail below, is a fully differential charge-to-voltage conversion transimpedance amplifier (TIA). Data from each row of the kernel is read out before the next row is sampled on CMS and CMR.

In accordance with a preferred implementation, pixel averaging happens in the row direction first. For instance, assuming a 3×4 kernel selected size, values (signal & reset levels) from three different rows (same column) are successively sampled on CMS and CMR, respectively. Every sampling is followed by an integration. After three cycles, capacitors CIS and CIR hold the accumulated result from the three rows of the kernel. In order to accumulate the signal from these three rows, column-integrators are reset only every third cycle—i.e. RSTC is closed not in every cycle (since that would erase that data from CIS and CIR), but every third cycle, allowing the capacitors to add to the previous signal. The entire process happens in column parallel fashion, generating summation in the row direction. In order to generate the 3×4 kernel, integration in the column direction needs to be carried out. This is done during readout by simultaneously closing four adjacent CS signals. Each closure of CS causes the accumulated row values from four neighboring columns to be summed together in the global output integrator 70. It should be readily appreciated that associated column integration switches are embedded in the column select logic 60. An alternative method is to progressively close CS switches, and then successively integrate the adjacent column values in COS and COR. The only difference then is that RST0, the reset switch in the output stage, is closed every fourth cycle (for a 3×4 kernel), instead of every cycle, as might typically be expected.

The kernels can be placed anywhere in the array, and are selected through row and column decoders. Hence, the size and direction of kernels is fully user programmable. In a preferred implementation, the rows and columns are selected in sequential order, however this is easily user definable, and any order could be selected. Random access is a matter of which row and column decoders are selected. Programming the size of the summation kernels is essentially determined by switching.

Figure 3:
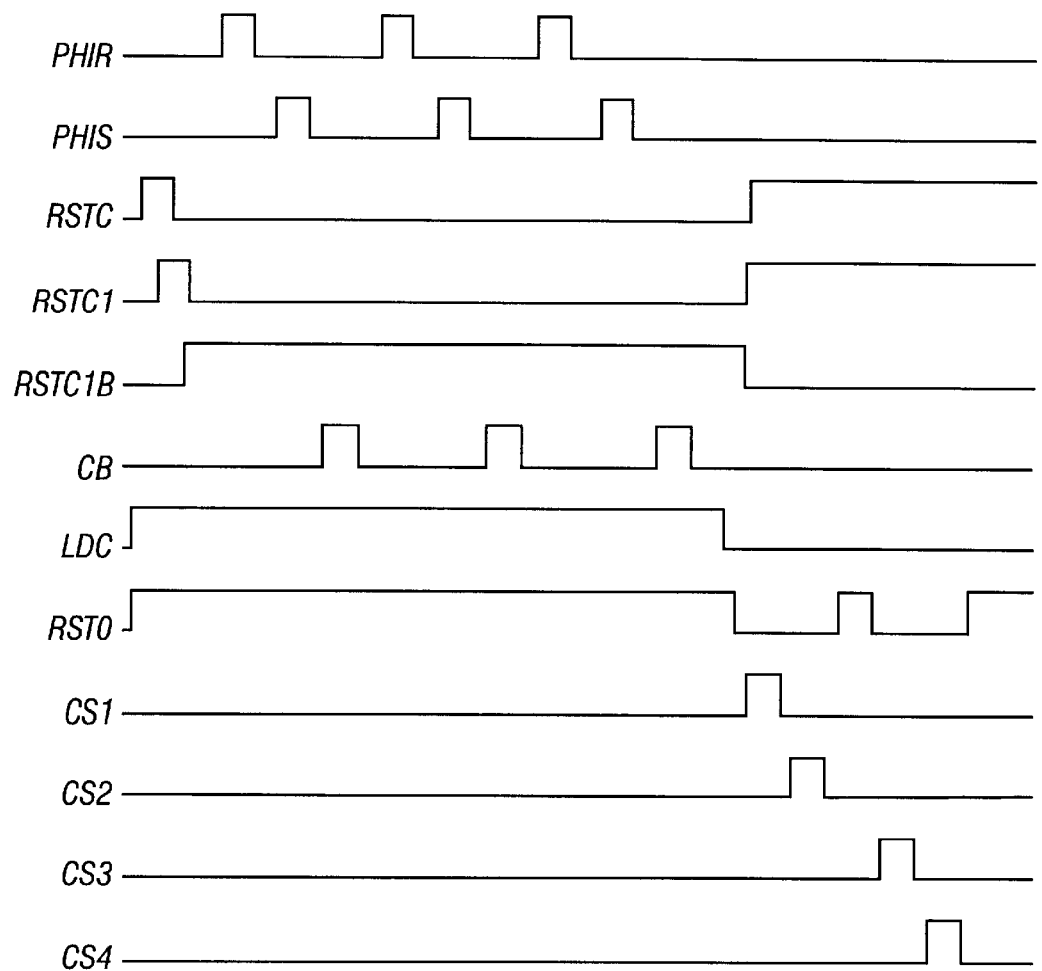
FIG. 3 shows an exemplary timing diagram for generating two adjacent 3×2 kernels using the imager of the present invention.

A timing diagram for generating two adjacent 3×2 kernels is shown in FIG. 3.

During pixel readout, column integrators 35 are reset by pulsing RSTC and RSTC1 high. At that point amplifier A offsets are stored on the capacitors CIS and CIR. When $V_{cm}$ is the common-mode voltage, during the reset phase, the amplifier A offsets force the input of the amplifiers to be: $V_{cm}+V_{offs}$, and $V_{cm}+V_{offr}$, respectively, where identifiers r and s refer to the signal and reset side, the two branches of amplifier A. For reference purposes, signal side shall be at the top and reset side at the bottom (see FIG. 2). During reset, the potentials across the capacitors are: $V+-V_{cm}-V_{offs}$, and $V+-V_{cm}-V_{offr}$, respectively. In the next phase, RSTC1B is turned high, connecting the capacitors (CIS and CIR) across the amplifier A. Since the amplifier input nodes remain at the previous levels (i.e., $V_{cm}+V_{offs}$, and $V_{cm}+V_{offr}$, respectively), voltages at the output of amplifier A become V+, and are independent of $V_{offs}$ and $V_{offr}$, indicating the outputs are free from offset. Offset elimination is extremely critical, since one or more columns are summed together. In presence of offset that will vary from one column to another, this will result in an unacceptably high fixed pattern noise in the multi-resolution output.

Following the offset correction phase, ROW 1 is selected. The reset and the signal levels from the pixels in that row are sampled by enabling PHIR and PHIS respectively as shown in FIG. 3. ROW 1 is the first row of the kernel, and can be located anywhere in the pixel array. The signals, sampled on CMR and CMS respectively, are VR and VS. The integration is completed by closing the rowbar CB thereby averaging the contents of the two capacitors CMS and CMR. This causes amplifier A outputs to become:

$$V_{os}(1) = V_{os}(0) + \frac{CMS}{CIS} \cdot \frac{V_R - V_S}{2}$$

$$V_{or}(1) = V_{or}(0) + \frac{CMR}{CIR} \cdot \frac{V_R - V_S}{2}$$

where numbers in parenthesis denote values at the end of a cycle. Identifier 0 is reserved for the reset cycle. As a result of this operation, a signal of $(V_R-V_S)$ is added differentially to both sides of the amplifier branches, causing the voltage on CIS to go up by $0.5*(V_R-V_S)$ and the voltage on CIR to go down by the same amount. As can be seen from the timing diagram, this process is carried out three (3) times to generate summation for pixels from a given column and three successive rows.

Following the row summing, LDC is pulsed low, sampling the row accumulation signals onto CLS and CLR respectively. At this point the column integrators are reset, preparing them for the next cycle of kernel summing. In order to read two kernels, each of 3×2 size, the successive column selects (CS1 through CS4) are pulsed high. RST0 is used to reset the global amplifier (A0+ and A0−). In order to sum 2 columns, RST0 is pulsed high before CS1 and CS2 are pulsed, ensuring one kernel of 3×2 size is ready for readout. Following this, RST0 is pulsed again to prepare for generation of the second kernel sum, which proceeds along the same lines, except that CS3 and CS4 are pulsed successively, instead of CS1 and CS2.

Each column integrator 35 generally described above includes a fully differential switched-capacitor integrator, a pair of column memory capacitors, CLR and CLS, and the MOS switches (MS, MR, CB, MMS, MMR, MC1, MC2, MC3, MC4, MC7 and MC8) needed for the integration operation. The sample and hold capacitors, CMR and CMS, for the pixel reset and signal levels serve as the input capacitors for each column integrator 35. The column memory capacitors, CLS and CLR, are the input capacitors for the global output integrator 70.

The global output integrator 70 uses two matched single-ended two-stage opamps. The illustrative implementation is configured to drive 30 pF and 1 MW load at above 8 Mpixels/sec required for 30 frames/sec readout of a 512× 512 element array. Amplifier A is a folded cascade opamp with switched capacitor common mode feedback circuit. Its operation is set for much lower speed due to the column parallel readout. The designed 2 MHZ unit gain frequency and 60 dB DC gain are sufficient for column parallel integrator settling with better than 9-bit accuracy. The amplifier design is optimized, in a conventional manner, to use minimum transistor size and lowest bias current.

For an n×m (n columns and m rows) kernel summation readout, signals from m rows of the sensor pixel are integrated by the column integrators 35 one row at a time. The reset and signal levels of each row are first sampled on the S/H capacitors CMS and CMR as the integrators 35 are reset. They are then differentially integrated on the integrating capacitors CIS and CIR. This process continues until all the rows in a given kernel are summed. The reset level pertains to the output of the pixel (at the input to the COLUMN block) when it is reset (when RSTP is turned on), and the signal level pertains to that the output of the pixel after the signal charges have been dumped in the sense node.

The integrated signals are sampled and accumulated on the column memory capacitors CLS and CLR. After the row summation is completed, every n consecutive columns are integrated after each reset of the global integrator 70. The summed signals from n×m kernels are read out serially from the output of the global integrator 70. The summation kernel size is programmable according to the illumination condition.

By using a square kernel size of n×n, the S/N enhancement is √n. At low illumination, S/N enhancement is greater than √n since the circuit read noise dominates in the imager noise.

The column-wise high residual fixed pattern noise (FPN) is mostly caused by the column opamp offset. In the fully differential readout, the offset is first sampled on the feedback capacitors as the integrator is auto-zeroed. To first order, it is compensated at each step of signal integration. Clock feedthrough appears as common mode pulse to the integrator and does not contribute to FPN. Residual FPN is due to the capacitor ratio mismatch on the two sides of the integrator and is given by, $$V_{OS.O} = m(\alpha_R - \alpha_S)V_C = m\Delta\alpha V_C$$

where m is the number of row summation, Δα is the mismatch in capacitor ratio and Vc is the common mode voltage. The temporal read noise consists of noise from the pixel, the detector shot noise, noise associated with switching (kTC noise) and noise from the opamps. The output referred noise for n×m kernel summation can be approximated by, $$\langle V_\sigma^2 \rangle \approx n \frac{2kT}{C_M} \alpha^2 \{2m\alpha^2 + \alpha + 3\beta + 2m(1+\alpha)\beta + mg^2\overline{N}\} \quad (2)$$

$$C_{MR} = C_{MS} = C_M; C_{IR} = C_{IS} = C_I; C_{LR} = C_{LS} = C_L;$$

$$C_{OR} = C_{OS} = C_O; \alpha = \frac{C_M}{C_I} = \frac{C_L}{C_O}; \text{where } \beta = \frac{C_M}{C_L};$$

g is the conversion gain measured in volts/electrons; and $\overline{N}$ is the average number of electrons per pixel during a single exposure. The noise voltage at full resolution readout is estimated to be about 320 mv for 125 frames/sec image readout rate, which is very close to the measured value.

Column-wise fixed pattern noise is caused by the mismatch between the two branches of the amplifier, caused by threshold voltage mismatches. This causes the two differential outputs to be unbalanced around the common-mode level (the ideal average of the output signals). This is corrected by sampling the unbalance in CIS and CIR during reset (RSTC is high).

In another preferred embodiment, a 128×128 prototype sensor was implemented by using a 1.2 μm single poly, double metal, n-well process with linear capacitor option. The sensor pixel size was 24 μm×24 μm with an optical fill factor of 29%. The column circuit was laid out in the 24 mm column pitch and had a total length of about 0.9 mm. The total chip area was about 4.7 mm×5.2 mm.

The fabricated parts were tested up to 125 frames/sec. The tested readout speed was limited by the capability of the pulse generator and the data acquisition board used in the test bed. The characterization results are summarized in the following table.

TABLE 1

Summary of the test results.

| | |
|---|---|
| Imager format | 128 × 128 |
| Integrator linearity: | better than 8 bit out of 1.8 V swing |
| Sensor saturation: | 1.2 V |
| Temporal Noise: | 303 μV r.m.s. |
| Dynamic range: | 72 dB (disregarding FPN) |
| Conversion gain: | 8.3 μV/e |
| Power consumption: | 24 mW @ 125 frames/sec |
| FPN: | 6 mV |
| Dark current: | 54 mV/sec (0.6 nA/cm² |

The sensor demonstrates 1.2 V saturation signal, 72 dB dynamic range and 8.3 mV/e− conversion gain. The FPN is about 6 mV (0.5% saturation), read noise 300 MV and dark current 0.6 nA/cm². More than 40% of the total 24 mW power is consumed by the global integrator 70 opamps due to the required driving capability.

Figure 4A:
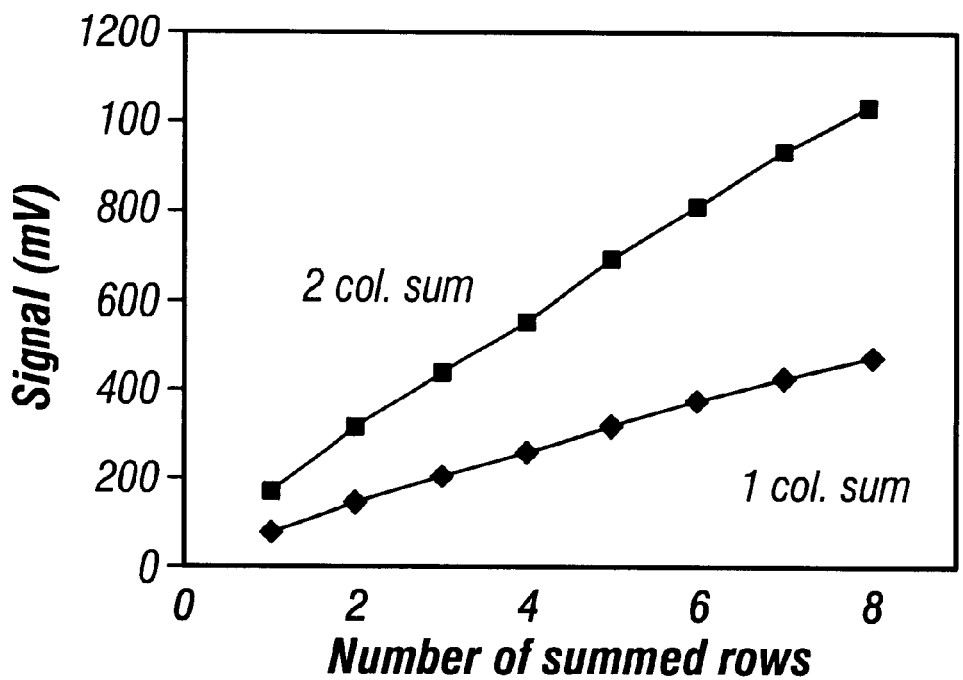
FIGS. 4A and 4B graphically shows expected results of signal detectibility as a function of kernel size achievable by the imager of the present invention.
Figure 4B:
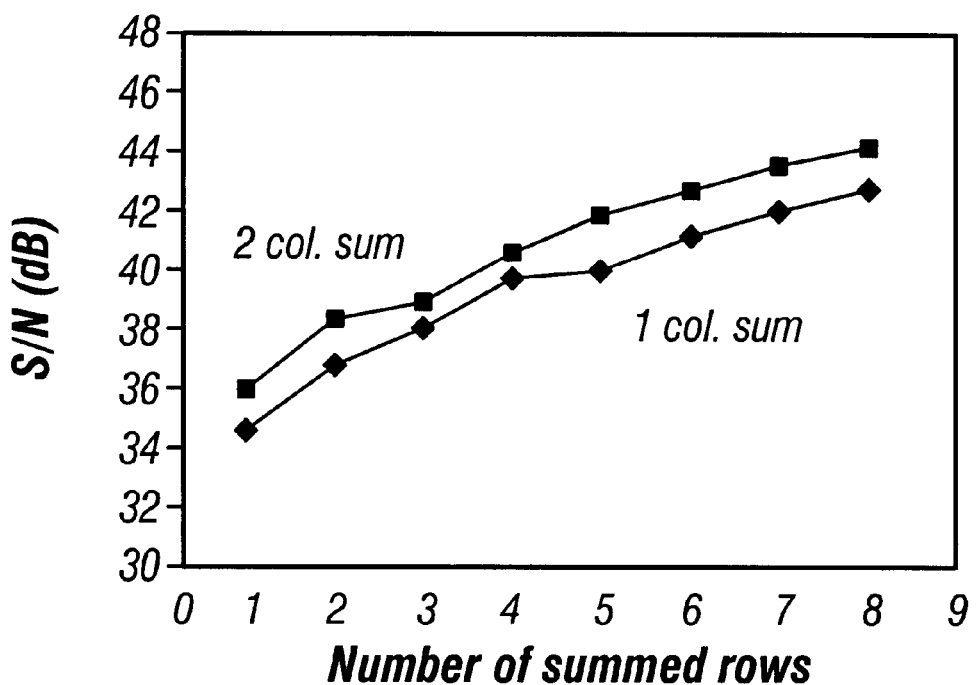

FIG. 4 shows the detailed measurement for signal (mV) and SNR(dB) enhancement as the kernel size is increased from 1×1 to 2×8 at constant illumination and exposure time. The output signal linearity over 1.2 V range indicates good accuracy of the row and column summation. An 11-dB SNR improvement is achieved, as expected by the theoretical prediction from Equation 2.

In sum, a multi-resolution APS for light adaptive imaging applications has been demonstrated by successfully integrating fully differential opamp based integrator circuits. Good uniformity and low readout noise was achieved. Enhancement of SNR at low light level was demonstrated to have been achieved by programmable multi-resolution readout at constant frame rate.

The fully differential implementation presented above suppresses clock feedthrough and all other sources of common mode noise, particularly substrate coupling and capacitive coupling noise. Substrate coupling noise arises from variations on power, ground and signal lines, and its magnitude can be significant due to reduction in substrate resistance in nearly all advanced sub-micron CMOS process technologies. In the differential topology presented, the effects of these noise phenomena are suppressed by ensuring that only the difference signal can pass through the circuit. For instance, when signal is sampled on CMS and CMR, charge feedthrough from the switches MS and MR are bound to happen. However, since the switch and capacitance sizes are the same, the feedthrough voltage (Vf) will be nearly the same in both capacitors, especially for small signals where the signals sampled are close to each other. Because the circuit amplifies the difference signal, the common-mode feedthrough (Vf)) does not affect the circuit operation.

In accordance with the presently disclosed implementation, low-noise is achieved by using fully differential circuits so that all extraneous and pick-up noise is eliminated. Low-noise is critical for light-adaptive imaging, since without low noise, pixel binning will not produce sqrt(N) improvement in SNR for low-light level imaging. It should be appreciated that SNR enhancement for an n×n pixel is not sqrt(n) but n, since $n^2$ pixels are involved.

The imager disclosed herein has extended low-light detection capability, achieved by trading spatial resolution for increased SNR. Unlike the prior art multiresolution chip which produces averaged output and is therefore not suitable for low-light-level signal detection, imager 10 is well adapted for low-light-level signal detection. In the prior art imager, 6 dB attenuation to the signal was calculated which significantly impairs low-light-level signal detection. Imager 10 does not suffer from such attenuation.

When compared to the prior art frame-transfer APS imager with pixel-binning, the current implementation requires no frame buffer memory, thereby reducing the chip size by as much as three fold or more, while preserving pixel-binning capability and reducing read noise. The reduction in area enables large format light adaptive imager implementation without chip size posing limitations, as in previous imager architectures.

In addition, unlike CCD or off-chip summation solutions, the current approach provides orders of magnitude lower power due to use of CMOS imaging technology and low-power analog signal processing circuits. Particularly when compared to known off-chip summation approaches, the preferred implementation provides high speed low-light level data due to reduction of data volume through pixel binning.

Although only a few embodiments have been described in detail below, those having ordinary skill in the art would certainly understand that many modifications are possible in the preferred embodiment without departing from the teachings thereof.

All such modifications are intended to be encompassed by the following claims.

What is claimed is:

1. An active pixel sensor (APS) imager comprising:
   a semiconductor substrate;
   a pixel sensor array of (x) rows and (y) columns of pixels, formed on said substrate;
   a neighborhood selector, formed on said substrate, selecting a kernel of n by m pixels in said array;
   a column integrator array, formed on said substrate, defined by a plurality of column integrators, said column integrators coupled to corresponding columns of pixels and operating to differentially integrate pixel signals on each selected row for each pixel block;
   a column memory array, formed on said substrate, defined by an array of differentially integrated capacitor circuits which sum and hold the differentially integrated pixel signals from n selected column integrators to generate, at the end of a row summing cycle, a row summed charge signal indicative of said n pixels in said row; and
   a global output integrator, formed on said substrate, receiving said row summed charge signal for each of said m columns, and generating a pixel block summed output by summing said (m) signals.

2. The imager of claim 1, wherein said pixel sensor array includes a plurality of pixels, each of which include a photosensor element, and a buffer.

3. The APS imager of claim 1, wherein said neighborhood selector is variable, enabling multiple resolutions of modes.

4. The APS imager of claim 1, wherein each column integrator is a differential circuit including a pair of integrating capacitors configured to substantially eliminate extraneous and pick-up noise.

5. The APS imager of claim 4, wherein each capacitor circuit is a fully differential circuit including first and second summing capacitors said first summing capacitor for a signal level, and said second summing capacitor for a reset level.

6. The APS imager of claim 4, wherein each global output integrator is a fully differential circuit including a pair of opamps.

7. The APS imager of claim 1, wherein each pixel block is a square block.

8. The APS imager of claim 1, further comprising column select logic and row select logic generating addressing and timing control signals on the basis of a presently selected resolution mode.

9. The APS imager of claim 1, further comprising column select logic and row select logic generating addressing and timing control signals on the basis of a presently selected pixel block size.

10. A method of operating a pixel sensor, comprising:
    obtaining a pixel sensor imager including a pixel sensor array of (x) rows and (y) columns of pixels;
    defining a sub block of pixels, of (n) rows and (m) columns of neighboring row and column pixels, where n is less than x and m is less than y;
    differentially integrating pixel signals on each of said n rows, using a column integrator array defined by an array of column integrators, said column integrators coupled to said columns of pixels;
    summing and holding, said n rows, using a differential integrator, to generate at the end of a row summing cycle, an (n) row summed charge signal; and
    generating a summed output, using a global output integrator, by summing (m) of the n-row charge signals at the end of a column summing cycle.

11. The method of claim 10, further comprising generating addressing and timing control signals on the basis of a presently selected resolution mode.

12. The APS imager of claim 10, further comprising column select logic and row select logic generating addressing and timing control signals on the basis of a presently selected pixel block size.

* * * * *